United States Patent
Ferdman et al.

(10) Patent No.: US 6,268,942 B1
(45) Date of Patent: *Jul. 31, 2001

(54) SEGMENTED DISPLAY SYSTEM FOR LARGE, CONTINUOUS AUTOSTEREOSCOPIC IMAGES

(75) Inventors: Alejandro Jose Ferdman; Michael Anthony Klug; Mark Evan Holzbach, all of Austin, TX (US)

(73) Assignee: Zebra Imaging, Inc., Pelugerville, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/395,461

(22) Filed: Sep. 14, 1999

Related U.S. Application Data

(63) Continuation of application No. 09/019,449, filed on Feb. 5, 1998, now Pat. No. 6,088,140.

(51) Int. Cl.[7] .............................. G03H 1/26; G02B 27/22
(52) U.S. Cl. ............................ 359/23; 359/22; 359/462
(58) Field of Search ........................... 359/23, 474, 477, 359/22, 462, 463

(56) References Cited

U.S. PATENT DOCUMENTS

| | | | |
|---|---|---|---|
| 3,697,681 | 10/1972 | McCoy | 178/6.8 |
| 4,206,965 | 6/1980 | McGrew | 350/3.76 |
| 4,253,895 | 3/1981 | Chenault | 156/163 |

(List continued on next page.)

FOREIGN PATENT DOCUMENTS

| | | | |
|---|---|---|---|
| 479497 | 8/1992 | (EP) | G03H/1/26 |
| 729055 | 8/1996 | (EP) | G02B/27/22 |
| 2312528 | 10/1997 | (GB) | G02B/27/22 |

OTHER PUBLICATIONS

PCT International Search Report Mailed Jun. 1, 1999.

Edhouse, "Lasers Used to Produce Large Format Holograms," In: *Lasers–current Trends,* by Simon Edhouse, Holography Marketplace, Sixth Ed., Chapter 4, pp. 63–68, 1997.

Copending U.S. patent application Ser. No. 09/098,581 entitled Method and Apparatus for Recording One–Step, Full–Color, Full–Parallax, Holographic Stereograms filed Jun. 17, 1998.

*Primary Examiner*—Audrey Chang
*Assistant Examiner*—Jennifer Winstedt
(74) *Attorney, Agent, or Firm*—Skjerven Morrill MacPherson LLP

(57) ABSTRACT

The present invention is an apparatus and method for displaying large, continuous, autostereoscopic images. The present invention overcomes the size limitation of typical aulostereoscopic images by recording a continuous, autostereoscopic image onto separate sheets or segments of recording material, mounting the recorded segments to separate tiles, and then displaying the tiles to display a continuous, autostereoscopic image. Although the autostereoscopic image display of the present invention is comprised of separate segments, the present invention offers viewers of the display a unitary visual impression of a large, autostereoscopic image without apparent discontinuities.

In one broad aspect, the present invention provides a system for easily displaying segments of recording material to form a large, continuous, autostereoscopic image. The display can be disassembled into components that are light, compact, easily transportable, and easily storable. The overall system, accordingly, is notable for the ease and efficiency it provides in installing, disassembling, reinstalling and adjusting large, continuous, autostereoscopic images.

21 Claims, 2 Drawing Sheets

U.S. PATENT DOCUMENTS

| | | | |
|---|---|---|---|
| 4,268,123 | 5/1981 | Mesco | 350/310 |
| 4,364,627 | 12/1982 | Haines | 350/3.76 |
| 4,368,485 | 1/1983 | Midland | 358/64 |
| 4,411,489 | 10/1983 | McGrew | 350/3.76 |
| 4,445,749 | 5/1984 | Brenton | 359/23 |
| 4,655,563 | 4/1987 | Plante et al. | 350/611 |
| 4,778,262 | 10/1988 | Haines | 350/3.66 |
| 4,795,233 | 1/1989 | Moss | 350/3.75 |
| 4,832,445 | 5/1989 | Haines et al. | 350/162.2 |
| 4,834,476 | 5/1989 | Benton | 350/3.76 |
| 4,866,530 | 9/1989 | Kalua | 358/237 |
| 4,891,296 * | 1/1990 | Tsurukiri et al. | 140/142 |
| 4,903,137 | 2/1990 | Wakasa | 358/254 |
| 4,929,073 | 5/1990 | La Plaante et al. | 350/609 |
| 4,944,580 | 7/1990 | MacDonald et al. | 350/611 |
| 4,969,700 | 11/1990 | Haines | 350/3.66 |
| 5,121,227 | 6/1992 | Fisher et al. | 359/1 |
| 5,130,794 | 7/1992 | Ritchey | 358/87 |
| 5,138,471 | 8/1992 | McGrew | 359/21 |
| 5,194,971 | 3/1993 | Haines | 359/9 |
| 5,237,433 | 8/1993 | Haines et al. | 359/9 |
| 5,523,790 | 6/1996 | Kalua | 348/383 |
| 5,570,208 | 10/1996 | Kato et al. | 359/23 |
| 5,579,164 | 11/1996 | Chapnik | 359/618 |
| 5,589,956 | 12/1996 | Morishima et al. | 359/15 |
| 5,644,414 | 7/1997 | Kato et al. | 359/22 |
| 5,654,776 | 8/1997 | Furuya | 348/789 |
| 5,687,012 | 11/1997 | Kang et al. | 358/2 |
| 5,724,161 | 3/1998 | Smith et al. | 359/23 |
| 5,734,485 | 3/1998 | Buchkremer et al. | 359/25 |
| 5,825,540 | 10/1998 | Gold et al. | 359/23 |

* cited by examiner

SEGMENTED DISPLAY SYSTEM FOR LARGE, CONTINUOUS AUTOSTEREOSCOPIC IMAGES

CROSS-REFERENCE TO RELATED APPLICATIONS

This application is a continuation of U.S. application Ser. No. 09/019,449, filed Feb. 5, 1998 now U.S. Pat. No. 6,088,140 by Michael Anthony Klug, Alejandro Jose Ferdman and Mark Evan Rolzbach and entitled "Segmented Display System for Large, Continuous Autostereoscopic Images".

BACKGROUND OF THE INVENTION

1. Field of the Invention

The present invention relates generally to the field of autostereoscopic displays. More particularly, it concerns a system and method for displaying segmented autostereoscopic images such that they appear to form a large and continuous autostereoscopic image.

2. Description of Related Art

Autostereoscopic images, such as holograms, stereograms, holographic stereograms, lenticular images, and raster-barrier or parallax-barrier images, are two-dimensional (2D) or three-dimensional (3D) visual displays that may portray more visual information than standard 2D images, such as photographs, video displays, or monitor displays.

Due to limitations in the size of available media for recording autostereoscopic images and limitations in the autostereoscopic imaging and development technologies, it has been difficult to produce large autostereoscopic images. Typically, the largest size of available recording media is a roll with a width of about 1 or 2 meters and a length of about a few hundred meters. Thus, the width of available recording media limits one dimension of a conventional autostereoscopic image to about 1 or 2 meters. Besides the size of available recording media, other factors further limit the size of autostereoscopic images. For instance, i:r the case of holography, while exposing recording material, the material must not be allowed to move or vibrate more than a fraction of a wavelength. It is very difficult to hold large sheets of recording material that still while properly exposing the recording material. Some have enlisted the aid of computers to form component autostereoscopic images; however, due to limitations in computer processor speeds for the computations necessary to form computer-aided component images, the computation periods for calculating the components for a large, autostereoscopic image have been prohibitively expensive and prohibitively time consuming. Moreover, due to stringent geometrical display requirements, component images with significant depth are extremely troublesome to align. Thus, due to limitations in the size of available recording material and limitations in autostereoscopic imaging and development techniques, the largest, continuous, autostereoscopic images have generally been approximately 1 meter by approximately 1 or 2 meters.

One technique that has been used to produce large segmented, autostereoscopic displays has been to create a multitude of separate autostereoscopic images on separate recording sheets and then to display them next to each other. This technique has allowed large displays of smaller but discontinuous images or discontinuous windows of images. Such discontinuous images or windows have been easily displayed, because the segmented images or windows are separate and do not need to be closely matched with neighboring images or windows. This technique has not been used to form a continuous autostereoscopic image or a continuous window of an autostereoscopic image from segments of recording material, because it is very difficult to a match segment of recording material with its neighboring segments such that the resulting image or window appears continuous. Moreover, aligning segments of recording material for a large, 3D autostereoscopic image is slow, troublesome, and costly.

Unlike the process for aligning segments of recording material to form a large, standard 2D image, the process for aligning segments of recording material to form a 3D autostereoscopic image has even more requirements. Where the registration error is defined as the difference between where the point of an image should be and where it is, all images require registration errors between neighboring image points on consecutive segments to translate to be less than one arc minute ($1/60°$) relative to a viewpoint in order to appear continuous to the human eye. This requirement is readily met for 2D images, especially for large, standard 2D images such as standard 2D billboards. For standard 2D images, the visible effect of registration errors, such as those due to a gap between segments, become smaller and less noticeable with increased distance. Thus, aligning standard 2D images is easier when the image is meant to be viewed from a great distance. Moreover, 2D images are mainly sensitive to rotations about an axis perpendicular to the plane in which the image lies (i.e., the z-axis, in an orthogonal system where the x and y axes lie in the plane of the image). In other words, for 2D images small rotations about the x and y axes will not have as noticeable of an effect as small rotations about the z-axis. In contrast, many autostereoscopic images are sensitive to rotations about all three orthogonal axes. For instance, if the appropriate surface planes of the recording material of consecutive segments of the recording material for a continuous, 3D, autostereoscopic image are not aligned (i.e., are rotated about the x-axis with respect to each other) one segment may appear to be displaying a set of image points or a view that is higher or lower than the set of image points or the view displayed by a segment next to it. In addition, if the appropriate surface planes of the recording material of consecutive segments of the recording material for a continuous, 3D, autostereoscopic image are not aligned (i.e. are rotated about the y-axis with respect to each other), one segment may appear to be displaying a set of image points or the view that is more to the right or to the left of the set of image points or a view displayed by a segment next to it. It is difficult to avoid registration errors due to such angular offsets of segments about the x or y axis (i.e., tilting) because it is difficult to construct a surface, especially a large surface of rigid lightweight material, that is planar enough to avoid such offsets. Moreover, unlike standard 2D images, the registration error for a 3D autostereoscopic image linearly increases with a 3D autostereoscopic image point's distance to a recording surface. This can be a dramatic problem for a large, 3D, autostereoscopic image with significant depth, because the deeper the image, the more sensitive the display is to registration errors.

SUMMARY OF THE INVENTION

The present invention overcomes the size limitation of typical autostereoscopic images by recording a continuous, autostereoscopic image onto separate sheets or segments of recording material, mounting the recorded segments to separate tiles, and then displaying the tiles to display a continuous, autostereoscopic image. Although the autostereoscopic image display of the present invention is comprised of separate segments the present invention offers viewers of the display a unitary visual impression of a large, autostereoscopic image without apparent discontinuities.

In one broad aspect, the present invention provides a system for easily displaying segments of recording material to form a large, continuous, autostereoscopic image. The display can be disassembled into components that are light, compact, easily transportable, and easily storable. The overall system, accordingly, is notable for the ease and efficiency it provides in installing, disassembling, reinstalling and adjusting large, continuous, autostereoscopic images.

These and additional features of the present invention are accomplished, briefly, by an apparatus comprising segments of recording material, which form an autostereoscopic image, mounted onto closely fitting tiles with surfaces of the tiles formed with the same dimensions as the segments, a mounting structure to which the tiles can be mounted, and adjustable coupling devices that couple the tiles to the mounting structure in the appropriate relation such that the segments of the recording material display a large, continuous, autostereoscopic image.

By locating the adjustable coupling devices with a template or any other convenient positioning or locating device and then mounting the tiles to the mounting surface with the coupling devices, the tiles may be easily and correctly aligned, minimizing any gap between consecutive tiles. By mounting each tile to at least one adjustable coupling device, the errors due to rotations about the x or y axes (i.e., the tilt) between consecutive tiles can be easily adjusted to be minimal.

An adjustable coupling device may include a tilt adjuster and a fastener. The tilt adjuster of an adjustable coupling device may comprise male-threaded-members, such as but not limited to screws and bolts, and housings. In addition, the adjustable coupling device may also include an actuator which may be directly or remotely controlled.

Once the tiles are mounted to the mounting structure, they may be displayed for as long an interval as desired without further adjustments. Depending on the desired convenience for disassembling and reassembling the image, the fastener (s) in an adjustable coupling device may be but is not limited to a snap, screw, bolt, nail, rivet, hook, clip, clamp, hook and loop fastener, or adhesive. Moreover, the image may be easily transported between assemblies.

In accordance with long standing patent law convention, the words "a" and "an" when used in this application, including the claims, denotes "at least one."

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

The following examples are included to demonstrate illustrative embodiments of the invention. It should be appreciated by those of skill in the art that the techniques disclosed in the following examples represent techniques discovered by the inventors to function well in the practice of the invention, and thus can be considered to constitute exemplary modes for it, practice. However, those of skill in the art should, in light of the present disclosure, appreciate that many changes can be made in the specific embodiments which arc disclosed and still obtain a like or similar result without departing from the spirit and scope of the invention.

In one general aspect, the present invention provides a convenient system and method for displaying a large, continuous, autostereoscopic image formed from separate segments of recording material. Some presently illustrative embodiments are depicted in FIG. 1, FIG. 2A, FIG. 2B, FIG. 3, FIG. 4, and FIG. 5.

Figure 1:
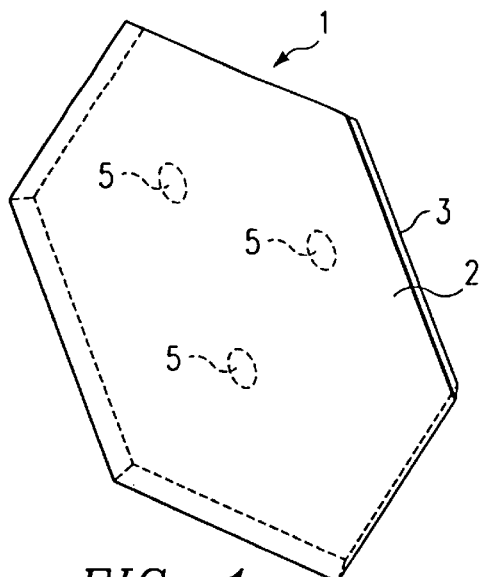
FIG. 1 is an isometric view of a hexagonal tile.
Figure 2A:
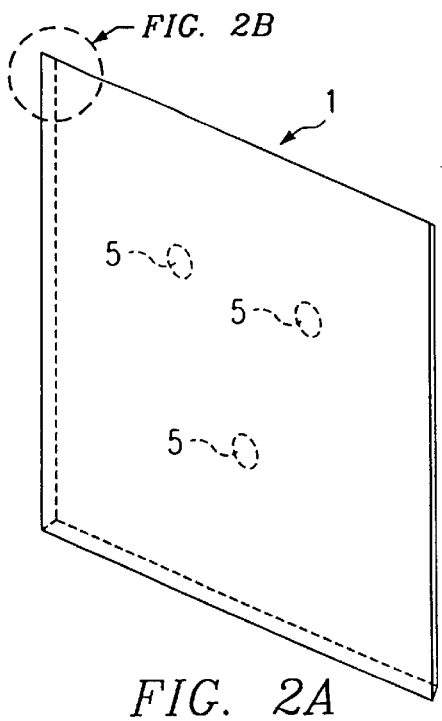
FIG. 2A is an isometric view of a rectangular tile with a rectangular segment of recording material for an autostereoscopic image fixed to one surface of the tile.
Figure 2B:
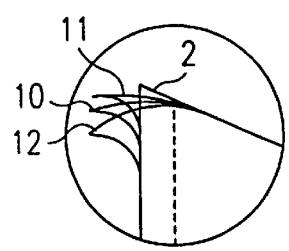
FIG. 2B is an enlarged isometric view of one corner of the rectangular tile and rectangular segment of FIG. 2A.

Referring to FIG. 1 and FIG. 2A, FIG. 2B, tile 1 has a front surface 2 and a back surface 3. Although depicted in FIG. 1 as a regular hexagon, tile 1 can be formed to be of any convenient geometric shape, that is capable of assembly into a unitary structure. Suitable shapes include but are not limited to hexagons, rectangles, squares, and triangles. Tile 1 may be formed by a template. For autostereoscopic images that are meant to be displayed on a planar surface, the front surface 2 of tile 1 should be smooth and substantially flat; and the shape of tile 1 may be any that enables easy matching of the edges of the front surfaces of consecutive tiles 1 together. For autostereoscopic images that are meant to be displayed on non-planar surfaces, such as but not limited to cylinders or spheres, the front surface 2 of tile 1 should be smooth and shaped to substantially lie in the desired display surface. For instance, front surface 2 of tile 1 may be flat or shaped as a partial cylinder to form part of a cylindrical display surface. As another example, front surface 2 of tile 1 may be shaped as a three verticied arched element to form part of a spherical display surface. Tile 1 is preferably made of a strong, inflexible or rigid, lightweight material, such as but not limited to aluminum honeycomb or acrylic. The edges of tile 1 may be beveled to facilitate easy mounting and enable more play in angular adjustments about the x or y axes. In addition, tile 1 may be reusable.

On the front surface 2 of tile 1 depicted in FIG. 2A, and FIG. 2B, is affixed a segment of recording material for part of a large, continuous, autostereoscopic image 10. Segment 10 may be a single sheet of autostereoscopic recording material, such as but not limited to a photopolymer sheet or a silver-halide photographic sheet. In an illustrative embodiment, the dimensions of segment 10 are those of the largest, conveniently sized sheet of recording material. It will usually be most convenient for the size of the front surface 2 of tile 1 to be the same size as a conveniently sized single segment 10 of recording material. For instance, if the dimensions of a segment 10 of recording material that is convenient to work with are about 1 meter by about 1 meter, then the front surface 2 of tile 1 to which segment 10 is fixed should have the same dimensions. If desirable, segment 10 may also be comprised of multiple sheets of autostereoscopic recording material that are carefully aligned with each other. Segment 10 may be fixed to front surface 2 by an adhesive layer 11 or by other conventional mounting techniques, such as but not limited to dry mounting. If desired, more than one segment 10 may be mounted on top of each other. For instance, segments 10 for monochromatic stereoscopic images may be mounted on top of each other to produce a full color segment for a stereoscopic image. Adhesive layer 11 may be a thin sheet of adhesive. If front surface 2 is not a continuous, dark color and if segment 10 is a segment for a reflective hologram, then adhesive layer 11 may preferably comprise a dark, such as black, homogeneously colored adhesive or a dark sheet; covered with adhesive to allow for better color resolution of the reflective hologram. If desired, segment 10 may be covered by one or more substantially clear layer of protective laminate 12, such as but not limited to a mylar sheet.

Figure 3:
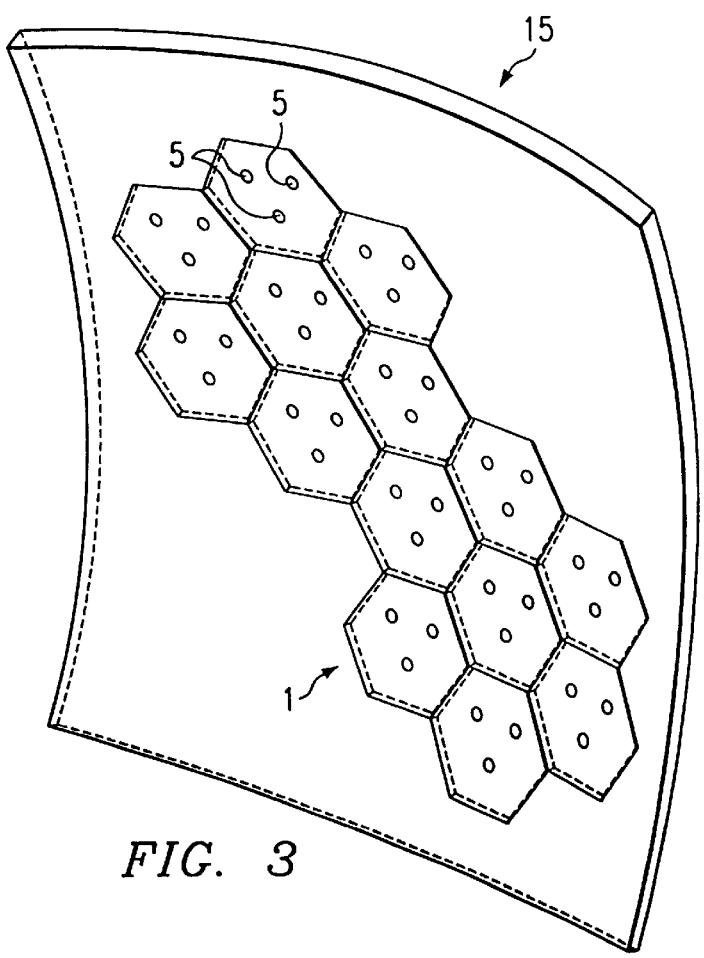
FIG. 3 is an isometric view of a plurality of hexagonal tiles, mounted on a mounting structure in a manner that allows the segmented display of a continuous, autostereoscopic image.
Figure 4:
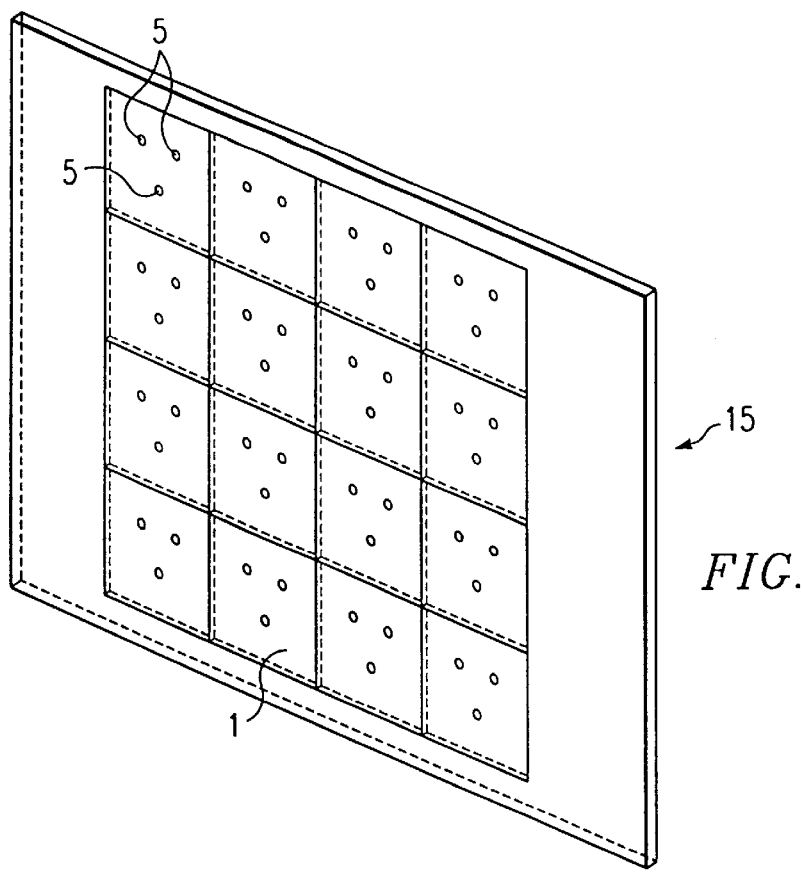
FIG. 4 is an isometric view of a plurality of rectangular tiles mounted on a mounting structure in a manner that allows the segmented display of a continuous, autostereoscopic image.
Figure 5:
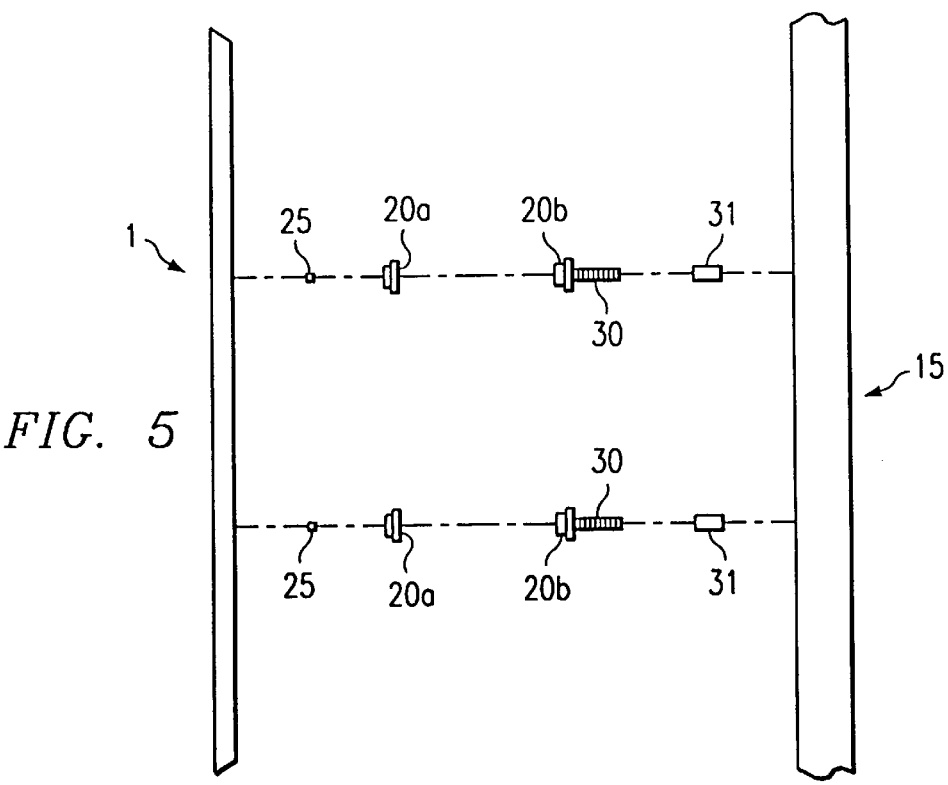
FIG. 5 is a side view of one possible embodiment of a set of adjustable coupling devices.

Referring to FIG. 3, FIG. 4, and FIG. 5, mounting structure 15 is a structure that can readily support the weight of the tiles 1 needed to display at least one large, continuous, autostereoscopic image. Mounting structure 15 is preferably composed of one or more pieces of lightweight, inflexible or rigid material, such as but not limited to aluminum honeycomb. Mounting structure 15 is preferably at least as large as about the size of a large, continuous, autostereoscopic image to be displayed. Mounting structure 15 is preferably generally shaped to approximate the display surface for a large, continuous, autostereoscopic image. For instance, if a large, continuous, autostereoscopic image is to be displayed in a planar fashion, mounting structure 15 should be generally flat or planar. If a large, continuous, autostereoscopic image is to be displayed in a spherical fashion, mounting structure 15 should be generally spherical in shape.

Tiles 1 should be mounted to mounting structure 15 such that the tiles 1 to which segments 10 for the large autostereoscopic image are fixed may be matched such that the tiles 1 display a large, continuous, autostereoscopic image.

Tiles 1 may be mounted to mounting structure 15 by an adhesive. In such an embodiment of the invention, the adhesive may also serve as a tilt adjuster. Adjustments to the rotations about the x or y axis (i.e., tilt) between consecutive tiles may be made by applying more or less adhesive between a tile 1 and mounting structure 15 before the adhesive has set. If desired, adhesive may be applied only between three distinct areas, patches or points 5 on the back surface of each tile 1 and the mounting structure 15.

In the alternative, tiles 1 may be mounted to mounting structure 15 by an adjustable coupling device which may include a fastener, such as but not limited to a snap, clip, hook, clamp, bolt, hook and loop fastener, nail, or screw. One or more fastener at points 5, may be used per tile. However, an illustrative embodiment uses three snap-type fasteners for each tile 1 such that tile 1 is not substantially overconstrained and may be easily mounted or unmounted. The location(s) of fastener(s) on each tile 1 is preferably the same for each tile 1. A template or jig may be used to locate the position of a fastener.

An adjustable coupling device may include a fastener and a tilt adjuster. The position of a tilt adjuster on mounting structure 15 may be conveniently located with a template or jig corresponding to the template or jig used to locate the fastener positions on the tiles 1. One embodiment of a tilt adjuster comprises threaded housing 31 that is fixed in or on the mounting structure 15 and male-threaded-member 30 that can be threaded into housing 3;1. Male-threaded-member 30 may be but is not limited to a bolt, screw, or threaded rod. One housing 31 may be used for each male-threaded-member 30. In the alternative, one housing 31 may be used for more than one male-threaded-member 30. In such an embodiment the housing 31 may be a strip of material with more than one threaded hole.

In another illustrative embodiment, the fasteners are two-sided snaps. The female-snap-side 20a may be fixedly attached to tile 1 by a suitable fixing means 25, such as but not limited to a rivet, screw, bolt, adhesive, nail, clip, or clamp. Head of male-threaded-member 30 may comprise or may be attached to male-snap-side 20b. By adjusting how far each male-threaded-member 30 is threaded into housing 31, the tilt of any given tile with respect to the tiles next to it may be readily adjusted.

In an alterative embodiment, the adjustable coupling device is positioned such that a tilt adjuster is attached to a tile 1 and a fastener of the adjustable coupling device is attached to mounting structure 15.

In yet another illustrative embodiment, the tiles 1 may be easily mounted to the mounting structure 15 by coupling female-snap-sides 20a to male-snap-sides 20b. Of course, male-snap-sides 20b may be substituted for female-snap-sides 20a if female-snap-sides are substituted for male-snap-sides. An additional advantage of using detachable coupling-type fasteners, such as but not limited to snaps, is that the tiles 1 may be easily unmounted. Once adjusted, the display may remain as long as needed. However, if necessary, the display may be easily disassembled by decoupling the snaps or other type of detachable couplings. Then the tiles 1 may be stored or transported. Moreover, the tiles 1 may be easily re-mounted to the mounting structure 15.

While the methods and apparatus of this invention have been described in terms of illustrative embodiments, it will be apparent to those of skill in the art that variations may be applied to the methods and apparatus and in the steps or in the sequence of steps of the methods described herein without departing from the concept, spirit and scope of the invention. All substitutes and modifications apparent to those skilled in the art are deemed to be within the spirit, scope and concept of the invention as defined by the appended claims.

What is claimed is:

1. An apparatus for displaying an autostereoscopic image comprising:

a plurality of segments of recording material with each segment having a portion of the autostereoscopic image recorded thereon;

a plurality of tiles configured for assembly into a unitary structure with each tile having front and back surfaces; the segments of the recording material mounted on respective front surfaces of the tiles;

a mounting structure adapted to receive the plurality of tiles; and a plurality of non-electric, manually adjustable coupling devices for respectively coupling the back surface of each tile with the mounting structure to enable tilt adjustment of the tiles relative to one another to display the continuous autostereoscopic image without apparent discontinuities.

2. The display apparatus of claim 1 wherein the autostereoscopic image comprises a holographic stereogram.

3. The display apparatus of claim 1 wherein the autostereoscopic image comprises a full parallax holographic stereogram.

4. The display apparatus of claim 1 wherein the autostereoscopic image comprises a horizontal parallax only holographic stereogram.

5. The display apparatus of claim 1 wherein the autostereoscopic image comprises a full color holographic stereogram.

6. The display apparatus of claim 1 further comprising each segment of recording material and the respective tile having substantially similar dimensions and configuration.

7. The display apparatus of claim 1 further comprising multiple segments of recording material mounted on the front surface of each tile to display multiple autostereoscopic images.

8. The display apparatus of claim 1 further comprising a substantially clear, laminate layer on at least one of the segments of recording material.

9. The display apparatus of claim 1 further comprising each tile having substantially the same geometry.

10. The display apparatus of claim 1 wherein at least one of the tiles comprises an aluminum honeycomb.

11. The display apparatus of claim 1 wherein the mounting structure comprises an aluminum honeycomb.

12. The display apparatus of claim 1 wherein the mounting structure comprises a generally planar configuration.

13. The display apparatus of claim 1 wherein the mounting structure comprises a generally curved configuration.

14. The display apparatus of claim 1 wherein the front surface of each tile compromises a substantially planar configuration.

15. The display apparatus of claim 1 wherein the adjustable coupling devices further comprise male and female fasteners.

16. The display apparatus of claim 1 wherein the adjustable coupling devices further comprise a plurality of adhesive couplings.

17. An apparatus for displaying at least one substantially continuous hologram comprising:

a plurality of segments of recording material having a portion of the hologram recorded on each segment;

a plurality of tiles generally geometrically congruent with the segments; each tile having a back surface and a front surface with at least one of the segments mounted on the font surface; and at least one non-electric, manually operated tilt adjuster coupling the back surface of each tile with a mounting structure in an orientation relative to the other tiles to display the substantially continuous hologram without apparent discontinuities.

18. A method for displaying a hologram, comprising:

recording respective portions of the hologram on a plurality of segments of recording material;

forming a plurality of tiles with each tile having a front surface and a back surface;

mounting of the segments of recording material respectively on the front surfaces of the tiles;

adjustably coupling the back surface of each tile to a mounting structure at three distinct areas; and adjusting the adjustable coupling to reduce visual effects of any displacement between the segments to display the hologram without apparent discontinuities.

19. The method of claim 18 wherein the step of forming a plurality of tiles further comprises providing a template for each tile and using the template to form the respective tile.

20. The method of claim 18 wherein adjustably coupling the back surface of each tile to the mounting structure further comprises:

providing a template for positioning at least one adjustable coupling adjacent to the back surface of each tile;

using the template to find a desired position on the back surface of the respective tile for the adjustable coupling; and attaching the adjustable coupling to the back surface of the respective tile at the desired position.

21. The method of claim 18 wherein adjustably coupling the back surface of each tile to the mounting structure further comprises:

providing a template for positioning at least one adjustable coupling on the mounting structure;

using the template to find a desired position on the mounting structure for the adjustable coupling; and attaching the adjustable coupling to the mounting structure at the desired position.

* * * * *

UNITED STATES PATENT AND TRADEMARK OFFICE
CERTIFICATE OF CORRECTION

PATENT NO. : 6,268,942 B1  
DATED : July 31, 2001  
INVENTOR(S) : Ferdman, Alejandro Jose; Holzbach, Mark Evan; Klug, Michael Anthony It is certified that error appears in the above-identified patent and that said Letters Patent is hereby corrected as shown below:

<u>Title page,</u>  
Item [73], Assignee: please delete "Pelugerville, TX" and insert -- Pflugerville, TX --.  
Item [57], Abstract, line 4, please delete aulosteroscopic" and insert -- autostereoscopic --.

<u>Column 1,</u>  
Line 4, after "Evan" please delete "Rolzbach" and insert -- Holzbach --.  
Line 41, after "instance," please delete "i:r" and insert -- in --.

Signed and Sealed this

Twenty-sixth Day of February, 2002

Attest:

JAMES E. ROGAN  
*Attesting Officer*     *Director of the United States Patent and Trademark Office*